Reissued Mar. 21, 1939 Re. 21,032

UNITED STATES PATENT OFFICE 21,032

METHOD OF PROCESSING FINELY DIVIDED SOLIDS

Emile C. de Stubner, New York, N. Y.

No Drawing. Original No. 1,965,764, dated July 10, 1934, Serial No. 590,319, February 1, 1932. Application for reissue June 6, 1938, Serial No. 212,191

18 Claims. (Cl. 134—35)

An object of my invention is to utilize aqueous mixtures of finely divided solids in the art of compounding. It is well known that finely divided solids are now used and combined in a direct manner with other elements in which combination they are the necessary and desired constituents. A great number of various types of mechanical devices are employed by the chemical manufacturer in the preparation of combinations in which the finely divided solids are incorporated in their dry or powdered state. In this specification I shall disclose methods and processes whereby finely divided solids in mixtures with water or when water-wet may be more directly and advantageously combined with such elements and the chemical manufacturer may thus simplify his processes, while at the same time obtaining superior products at reduced costs.

It is therefore my object to provide methods for converting aqueous mixtures of finely divided solids and to displace or replace either wholly or partially the water in such mixtures by constituents or vehicles of the desired product and such constituents or vehicles will hereafter be referred to as "compounding elements" or "element".

I will therefore disclose processes for incorporation of finely divided solids such as abrasives, fillers, colors, pigments, lakes and the like into products useful as or in the manufacture of: adhesives, insecticides, leather, leather-finishes, artificial leather, printing-ink, soap, candles, cosmetics, varnishes, varnish-stains, oil-stains, putties, wood-finishes, metal-finishes, flatting compounds, floor-wax, sealing-wax, coating compounds, plastics, lubricants, rubber-goods, tires, paint, paint-enamels, Celluloid, lacquer, oilcloth, linoleum, etc. For convenience, all of said products will be hereinafter referred to as "consumer products".

In a preferred embodiment of my invention my further object is to disclose methods of removing water in the vapor phase from aqueous mixtures of finely divided solids under atmospheric pressure, increased pressures or diminished pressures (vacua) in the presence of and by compounding elements, the latter being a component or constituent also of the final and/or consumer product. My further preferred embodiment consists in the controllable transformation of water-wet finely divided solids into water-free water-insoluble compounding elements or compounds and my invention therefore consists as far as this phase is concerned in the control or control-system for removal of water in the vapor phase from aqueous mixtures of finely divided solids without permitting the solids to become dry.

Further and additional objects of my invention will more readily appear in the perusal of my specifications and examples. Aside from the economical advantages over present methods I desire to emphasize that the merits of my invention are reflected by the excellent quality of products when made in accordance with my teachings and that they derive their distinctive pleasing appearance and superior effectiveness from the uniformity and evenness of the nature and characteristics of their parent aqueous mixture. This mark of uniformity of appearance and superior effectiveness which distinguishes the individual batch or run is again reflected in any number of successive batches or runs which in their turn prove that variations in manufacture may be eliminated by my teachings which exclude the human element by depending upon the physical or chemical constants of the components utilized in process.

The quality of the above enumerated products depends largely also upon the complete saturation of the incorporated solids by and with the compounding element which thus facilitates their even distribution in the end or consumer products. Since it is technically far easier and more economical to obtain finely divided solids completely saturated, impregnated or wetted with water than it is to saturate them by impregnation with oil or viscous or plastic vehicles after they (the solids) have been dried i. e. in form of powders, I have therefore chosen and desire to employ these solids in a water-wet state or in admixtures with water and this in contravention of present manufacturing processes which utilize finely divided solids either in the dry state or in form of non-aqueous pulps in which the pulping medium is of volatile character. I have discovered when water is removed from water-wet finely divided solids in the presence of or by water-insoluble compounding elements that the compounding elements tend to combine or mix with the solids from which water has thus been removed. This tendency can be so stimulated that finely divided solids wet with water are converted into compounds which are freed from water.

My invention consists therefore in the control of conditions under which the ratio of water to finely divided solids to water-insoluble compounding elements in their mixtures is regulated and also in the control system by which such conditions are obtained. Also in this step the human element may be eliminated, the operator being guided for saturation of the solids with the compounding element by the true coefficient of absorption which is a physical constant of finely divided solids. Another object of my invention therefore is to disclose a method of dehydrating water-mixtures of finely divided solids by the compounding elements at either atmospheric pressure, increased pressures or diminished pressures (vacua) with or without agitation either continuously or intermittently and at suitable temperatures.

In order that my invention may be more clearly understood and the process of converting water-mixtures into water-freed compounds by removing water in the vapor phase defined, it is apparent that the compounding element must take the place of the water to keep the solids wetter, thus preventing them from forming dry lumps or dry agglomerates and that this must be done at a time when the water-wet solids are in admixture with the compounding element and hence under conditions under which emulsions obtain, and I have discovered that control of displacement or replacement of water in water-mixtures of finely divided solids by and with compounding element is obtained by regulating their relationship and whether the water is mixed in the compounding element (this being the external or continuous phase) or the compounding element is mixed in water (and this being the external, continuous phase) are of great influence upon both the result as well as "modus operandi".

Whatever explanation of the operation of methods and devices may be offered of the process as a whole or the intermediary steps and phases separately, I claim as my invention any process by which the removal of water in the vapor phase from mixture of finely divided solids and water-insoluble, compounding elements is or can be so regulated that the compounding elements and finely divided solids form a water-freed dispersion.

The presence of the compounding element during the removal of the water is of utmost importance as it may be used as the means for conveying heat to every phase in the mixture and is the temperature regulator par excellence. The function of the compounding element properly conditioned for evaporation of water can be compared to the hot stone upon which water is dropped. Just like the hot stone could not evaporate a quantity of water large enough to drown it, so it is of importance for success to add small quantities of water-wet finely divided solids to the compounding element. This may however be done in a thin stream in a continuous manner so that a proper balance between the evaporated water and the newly added water in the mixture is maintained. This step I shall illustrate in the example dealing with the incorporation of aluminum-hydroxide into linseed-oil. Its definite physical constants e. g. specific heat, conductivity of heat, etc., permit to use it as temperature-accumulator so to speak, which under proper agitation may be evenly charged with the desired amount of heat-units to evenly release them for evenly removing water in the vapor phase.

The manner of agitation also is among the conditions to be observed for success of a process embodying my invention. Agitation may be brought about by purely mechanical means e. g. moving the mass by means of mixing blades or similar contrivances away from the source of temperature supply so that temperatures may become evenly distributed throughout the mixture. Agitation also may be accomplished with agitation by air or other gaseous fluids or their mixtures and it is an object of my invention also to disclose methods of agitation by which control over the process may be exercised. My invention therefore also consists in and of a control-system which includes agitation besides the presence of compounding element under conditions of pressure and temperature sufficient to remove water in the vapor phase at a predetermined rate and velocity from mixtures with finely divided solids.

In a preferred manner of carrying out a process embodying my invention, I agitate the mixture of water, finely divided solids and compounding elements in an enclosed apparatus of the type of a still, which is insulated to prevent loss of temperatures and condensation of vapors when once formed. On the bottom of the still is a perforated coil connected with an air tank. This tank contains air under pressure which has been freed from moisture. I have found that a pressure of about 30 lbs. per square inch is a satisfactory pressure to maintain on the air and at such a pressure will be forced through the materials in the still and absorb moisture present in such materials. It is desirable in certain cases to use the air at a temperature not exceeding 57–58 degrees C., in which case the pipe, before entering the apparatus, is submerged for several turns in boiling acetone, which is kept at its boiling point in a still under reflux. Under such conditions air leaves the perforations at the desired temperature, agitates the mixture, is saturated with moisture drawn from the mixture, and thus removes water at atmospheric pressure in the vapor phase at temperatures below 100 degrees C. A determination of the moisture contents of the air as it leaves the apparatus, will give correct information as to rate and velocity at which water is removed and thus permits a calculation of the time in which all or any desired quantity of the water may be driven over as well as the amount of air to be conditioned for the process. It is in this way very easy to regulate and control the desired temperature by simply selecting instead of acetone the liquid of the elected boiling point e. g. methyl-alcohol B. P. 67 degrees C., benzol B. P. 98 degrees C. and the velocity of flow is under perfect control by regulating the pressure in the air tank and the release valve leading to pipe. Of course the process proceeds only evenly after the whole system has reached the temperature of the air as it leaves the perforated coil and this condition is obtained by the compounding element which evenly distributes the temperatures obtained from the warm air, which being the means also of agitation thereby aids and regulates the even distribution. The action of this complementary system of agitation i. e. air complementing the compounding element or vice versa, thus forming a control-system, manifests itself to the observer mistakable in no way and one need only follow the air bubbles through a window in the cover of the apparatus, the inside of which can be lighted by an electric light, to see how the compounding element traps the air and prevents it from rushing through the mixture too rapidly, thus giving it time to become saturated with water vapors so they may be carried out of the still. Instead of air any other gaseous fluid or their mixtures may of course be employed such as: carbon-dioxide, nitrogen, hydrogen, chlorine, etc. At the rate of which the coefficient of absorption becomes unbalanced due to the missing water which has been removed, displacement or replacement by the compounding element takes place until, if so desired, the combination of finely divided solid and compounding element obtains free from water, thus completing the process of converting water-mixtures into water-free mixtures.

Instead of the agitating gas entering the mixture through the perforations of a stationary coil, it may be introduced through openings in hollow mixing blades which can be set in motion and in this manner the mixture may be stirred by another force or energy added to the control system. Such apparatus of which the mixing blades or mechanical agitators are hollow belong to standard equipment in chemical manufacture, e. g. dough machines. As agitation by gases is not always desirable, preference may be given to stirring or mixing by mechanical means. In such a case the required temperatures for changing water into its vapor phase are obtained by contact of compounding element with the warmed or heated apparatus in which the process is carried on or out. The supply of the necessary temperatures may come from a number of sources such as: electric current, burning gas, circulating fluid in a jacket, etc., and can of course be regulated and controlled just as accurately as the air described above.

The foregoing examples deal with removal of the water-vapors under atmospheric pressure which do not necessarily require an enclosed apparatus. If, however, additional elements of control should become desirable, then the apparatus must necessarily be of the enclosed and even tight type to permit carrying out of the process under either increased or diminished pressures. Increased pressures will be resorted to when higher temperatures are aimed at and when decreased, slowed down velocity of formation of the vapor phase or of removal of the vapors is desired. This may be accomplished by a valve in the neck of the apparatus and by throttling the flow of vapor, control of the process is exercised. If, however, greater or increased velocity of formation and removal of vapor than at atmospheric pressure should become desirous, then also the enclosed and tight apparatus of the still type will be necessary, so that the mixture can be subjected to diminished pressures (vacua). Should it be desirable for instance to form and remove water vapors at a temperature not exceeding 68 degrees C. then as source of temperature supply may serve boiling methyl-alcohol under reflux in the jacket which must of course have an opening leading to a reflux condenser and if now in the apparatus, holding the mixture of water, finely divided solids and compounding elements, a vacuum of 22 inches is created and maintained, then the water changes from the liquid into the vapor phase and thus may be removed. To maintain this condition it is of course excluded to use air as means for agitation which in this case will be done by mechanical stirrers or mixing blades but advantage of either one i. e. agitation by gas or mechanical means may be taken by bringing them into play intermittently, for gases may be passed through the mixture while under vacuum, the source of which will then function as an aspirator sucking the gas through the mixture and thereby effecting and causing agitation. From my description it follows that the compounding element of course must not be volatile under conditions at which water changes into the vapor phase as otherwise it would be removed from the mixture together with the water vapors, neither must it be a solid, except that this also exists in a liquid or at least plastic phase such as resins, rubber, etc., otherwise it could not satisfy the coefficient of adsorption or absorption of the finely divided solids to combine with them by taking the place of the removed water. I am also disclosing as my discovery that the correct coefficient of absorption of finely divided solids e. g. pigments which never were in the dry or dried state, is different from that which is found for them after they had been dried and then powdered. My invention therefore also consists in and of the process of obtaining mixtures of water, finely divided solids and compounding elements in which the compounding element is present in an amount to correspond with and to satisfy that required by the coefficients of absorption or adsorption of the wet finely divided solids of the mixture.

It will be observed that processes embodying my invention are distinguishable from processes heretofore known in the art in the following novel and meritorious particulars:

(1) My present process utilizes the advantages of the water dispersion of finely divided solids, in which dispersions the finely divided solids obtain their optimum excellence of texture, structure, and color.

(2) A water-free compounding element is utilized to replace the water in the water dispersion and does so without impairment of the qualities of the solids in the water dispersion.

(3) Agitation of the water and solid dispersion and the water-free dispersion medium regulates the rate and velocity of the evaporation of the water and prevents localization of heat in the mixture.

(4) The processing of finely divided solids in accordance with my present invention permits their ready incorporation into consumer products with a saving of expense, time, and qualities, all of which are lost in present grinding operations which are completely eliminated by the use of processed solids produced by my present invention.

Before illustrating my invention by more specific examples, I shall describe the apparatus in which I prefer to carry out the present process.

Since the products of this invention are mostly of pasty or plastic consistency, I find that a kneading machine for operation under vacuum is the most suitable apparatus. This machine consists essentially of a rectangular trough curved at the bottom to form two half cylinders, carrying two blades and a perforated pipe on a saddle which divides the two half cylinders. The trough is provided with a jacket as is the cover to prevent condensation of vapors on its under side. In the cover are two plate glass observation windows, and a manifold with swinging joints for connection to condenser, receiver and vacuum line. The trough is fitted with a pyramid, counterbalanced cover, carrying a suitable gasket to afford an air-tight connection with the trough. The mixing blades are hollow and heatable and may be perforated to permit agitation both mechanical as well as by gases blown through perforation. The mixing blades are so designed and located that they sweep the entire area of the half cylinders on each revolution and revolving toward each other at unequal speeds and so pass the material back and forth from one to the other. In addition to this complete mixing action, an intensive kneading action is performed simultaneously by the squeezing and pulling of the material against the trough walls, the saddle in the bottom of the trough and between the blades themselves. Through one end of the trough is inserted a thermometer-well so that the stem is fully submerged in the mass being mixed. In the cover are openings for vacuum cocks, gauge and thermometer to measure the temperature of the vapors. Such a device is a standard machine. There are some special and supplementary features which particularly adapt such a machine for my process. One such special feature consists in a second jacket around the first jacket of the trough for the purpose of maintaining constant temperatures in the first jacket. Methyl alcohol may be kept boiling in the first jacket at a temperature of 67 degrees C. by circulating through the second jacket hot water or oil at a temperature of about 70 degrees C. The first jacket has an opening leading to a reflux condenser to prevent loss of vapors which are returned by the condenser into the liquid phase and fed back into the first jacket. Furthermore the trough has on an unjacketed end one or more inlets leading below the surface of the mass being mixed. These inlets are connected by valved pipes with storage or holding tanks (comparable to feed hoppers) so that from them controllable quantities of mixtures to be processed may be fed continuously or intermittently into the apparatus ad libitum. This device will be referred to hereafter as the "feed-inlet".

EXAMPLES

Under the term "colors in oil" commodities appear in the trade which unlike paint have a consistency of pastes. These colors in oil are concentrates of pigments and linseed oil. They are used by master painters to tint, color or shade paint bases which usually have white lead as their principal constitutent. By present methods the colors or pigments therein are incorporated into the oil by grinding them together on either burr-mills, roller mills, or the like. By the process of my present invention, such colors in oil may be manufactured without the use of grinding apparatus to incorporate the pigments into the oil.

EXAMPLE I

*Aluminum-hydroxide in oil*

A process embodying my invention is advantageous in the production of aluminum-hydroxide in oil which demonstrates the great importance of control over conditions effecting the removal of water from its water-mixtures. "Off-batches" in the "dry color" manufacture and particularly of fine lakes have their cause more often than not in the lack of control during the removal of the adhering water in the vapor phase. I have found that such variation may be eliminated by producing the aluminum-hydroxide in oil by my present process.

In the above-described apparatus of 350-400 gallons capacity are placed 600 pounds linseed-oil. The machine is closed, and connection is made with condenser, receiver and vacuum line. The mixing blades are kept rotating at 60 R. P. M. In the machine a vacuum of 24-25 inches is maintained. Into the first jacket with opened valve leading to the reflux condenser is put methyl-alcohol and through the second jacket warm oil at temperatures of about 70–75 degrees C. is kept circulating. This keeps the methyl-alcohol in the first jacket always boiling. The linseed oil in the machine will eventually reach a temperature of about 68–69 degrees C. but will not exceed 70 degrees C. The feed-inlet is now connected with the storage tank for aluminum-hydroxide pulp which is filled with 2700 pounds of said pulp of 15% aluminum-hydroxide content. The feed-inlet valve leading into the machine is now opened and the inflowing pulp is so regulated that the amount of inflowing pulp equals the amount of condensed water accumulating in the receiver. During this period lasting from 12–24 hours, the mass is continually agitated and the methyl-alcohol kept boiling. When the 2700 pounds of pulp will have been added, there will be in the receiver about 285 gallons of water and in the machine the mixture of 600 pounds linseed-oil and 400 pounds aluminum-hydroxide. Toward the end of the operation the vacuum is increased to 29 inches and maintained until the rate of flow of condensed water into the receiver will indicate that practically no more water is in the mass. At this point the warm oil in the second jacket is turned off and the methyl-alcohol in first jacket is drawn off and after closing valve to condenser, cold water is now circulated in the first jacket. The vacuum is however maintained and mixing continued until the thermometer indicates that the batch has cooled down to about 25–30 degrees C., when the process is completed. The merits of my present process in this case are:

(*a*) The mixture in machine cannot exceed 70 degrees C.

(*b*) The water is evaporated in small portions at a time by the agitated conditioned linseed-oil i. e. at a temperature not exceeding 70 degrees C. under pressure below atmospheric pressure.

(*c*) The linseed-oil replaces the evaporating water and thus mixes with the aluminum-hydroxide at a temperature not exceeding 70 degrees C.

(*d*) The chemical compound aluminum-hydroxide $Al_2O_3.3H_2O$ remains unchanged as the conditions of the linseed oil prevent its modification.

(*e*) At all times from the very beginning of the process, the amount of linseed-oil is far in excess of the water in the processed aluminum-hydroxide pulp i. e. when it comes in contact with the agitated warm linseed-oil inside the apparatus thus ideal conditions prevailing for completely impregnating and saturating the water-freed aluminum-hydroxide particles.

EXAMPLE II

*Bremen-blue in oil*

The blue pigment known as Bremen-blue is chemically a hydroxide of copper—$Cu(OH)_2$. While it is obtained without great difficulty as the desired precipitate, it is however, not so easy to maintain color and shade in the "dry color" as the conditions of separating the adherent water must carefully be observed. I will now show how by my invention the removal of water can be so regulated that color and shade of the precipitate will be maintained in the consumer products thus: Place in machine of Example I, 600 pounds of linseed-oil and 400 pounds of filterpress-cake consisting of 60 pounds Bremen-blue and 340 pounds water. Put cover on but leave valve leading to condenser and receiver open and also keep receiver open to atmosphere. Rotate mixing blades at 60 R. P. M. and blow warm, dry air by way of perforated pipe through the mass at 40 degrees C. This dry warm air will remove water from the mix in definite quantities, depending upon the amount of air blown through it. When by the removed water, space has become available, then through feed-inlet is added enough of pigment-pulp as this space permits, which will be somewhat like the first 400 pounds and may be judged by observing whether the rotating mixing blades are always submerged in such a manner that the whole mass is drawn into its radius of motion. This addition of pigment pulp is kept up in amounts of about 400 pounds until there have eventually been fed into the apparatus another 2600 pounds besides the 400 pounds which were placed together with the oil. When about 200 gallons of water have been removed by air-agitation, the air is turned off and the remaining water is evaporated under vacuum as described in Example I, with the result that as a consequence of the conditions in the control-system the pigment has retained its color when combined with linseed-oil, due to maintenance of the hydroxide of copper without modification of its precipitate state.

Example III

*Chrome yellow in oil*

In the machine are placed 120 pounds neutral lead-chromate, 280 pounds water and 400 pounds linseed-oil. I prefer the pigment in the form of an aqueous pigment pulp as for example, a filter-press cake. The mixing blades rotate at 40–60 R. P. M. Through the first jacket and also hollow mixing blades circulates warm water of about 45–50 degrees C. A vacuum of 26–27 inches is maintained. Distillation of water takes place slowly and can be estimated by the time it takes the condensed vapor to accumulate in the receiver. In other words the process is completed when the water will have been transferred from machine to the receiver. During the process are added another 1600 pounds of the 30% pigment-pulp gradually and regulated in such a manner that the amount added through feed-inlet corresponds to the volume of water removed by distillation which is equal to the condensate in receiver. The removal of the water vapors proceeds rather slowly and takes from 12–24 hours. It is however even and steady under the above conditions. This steady and even progress is at the same time the indicator of the steadily and evenly progressing replacement of the water by the linseed-oil to combine with the lead-chromate. Toward the end of the operation the vacuum is increased to 29 inches which of course increases the flow of condensed vapor into the receiver and thus speeds up the finishing of the batch. When the mixture in the machine is freed from water, it is discharged as in Example I.

Example IV

*Prussian-blue printing-ink*

Place in apparatus of Example I, 500 pounds Prussian-blue water pulp (filter-press cake) of 25% pigment content and 500 pounds thin linseed-oil printing-ink varnish. Close machine, mix by rotating blades at 40–60 R. P. M. Circulate through first jacket and blades warm water at 40 degrees C., blow dried, moisture free, warm air of 40 degrees C. through perforated pipe on bottom of trough at a rate and in such quantities that 10 gallons of water per hour are removed. While this process is in operation another 1500 pounds of the same pulp are added through feed-inlet gradually and under pressure of about 10 pounds to overcome the resistance caused by the air-agitation. When about 200 gallons of water have thus been evaporated, then are added 100 pounds of anhydrous wood-grease, also known as lanoline, and the air is turned off, but agitation is continued by mixing blades alone. The blowing of air through the mass has oxidized and polymerized the thin linseed-oil printing-ink varnish and thereby modified its viscosity to a higher degree. Before the addition of the wool grease the mixture represented an emulsion of the oil-in-water type, i. e. water being the external or continuous phase. The wool grease promotes emulsions of the water-in-oil type where oil is the external or continuous phase. When as in this example the wool-grease has been added, the mixture or rather the emulsion in the machine consists of 500 pounds Prussian-blue, 400 pounds water, 500 pounds printing-ink varnish and 100 pounds wool-grease. The emulsion still testing oil-in-water type. Now the temperature of the circulating water is raised to 50 degrees C. and the system is connected with the vacuum line and a vacuum of 26–27 inches is maintained and thus distillation of water continued during which the change from oil-in-water type to water-in-oil type emulsion takes place. Distillation is continued until all the water is removed and toward the end the vacuum is increased to 29 inches and when thus the mixture in machine is freed from water the combination of 500 pounds Prussian-blue with 600 pounds printing-ink-varnish-compound consisting of: 500 pounds linseed-oil varnish and 100 pounds anhydrous wool-grease is discharged as under Example I.

Example V

*Master-batch of rubber-zinc-oxide*

The apparatus for compounding rubber as to the working principles involved is the same as of Examples I–IV, but it is of course more strongly and sturdily built to stand up under the severe working conditions of rubber compounding. A zinc-oxide dispersion or pulp is first prepared as follows: to the mixture of 150 pounds of French zinc-oxide and 150 pounds water are added under continuous agitation 150 pounds more of zinc-oxide which makes the mix quite stiff and it seems as if not sufficient water was present to wet all the zinc-oxide. At this point are added gradually from a dropping funnel 2 pounds of commercial water-glass which usually is a 40% solution of silicate of soda and almost suddenly the stiff mass becomes liquid. When thus a homogeneous mixture is obtained, then add 150 pounds more of zinc-oxide, which again will make it appear stiff and dry but when again 2 pounds of the water-glass solution are added, it again becomes liquid as before. Now add a third portion of 150 pounds of dry zinc-oxide and again the mixture will seem dry and stiff, but another 2 pounds of water-glass solution will make it liquid again and the ultimate mixture consists now of 450 pounds zinc-oxide, 6 pounds commercial liquid water-glass and only 150 pounds of water. To this zinc-oxide dispersion are now added 1000 pounds of rubber-latex concentrate of 75% rubber content. Now the machine is closed and steam under 15 pounds pressure sent through jacket and mixing blades in this case rotors, which rotate at 30 R. P. M. As the mass is warmed, ammonia which is present in the commercial rubber latex is driven off and the rubber begins to coagulate. When thus the ammonia is expelled a vacuum rising slowly from 0 to 25 inches is turned on and there maintained until all the water is distilled off. Mixing and kneading is continued until the breaking down of the raw rubber without overworking or killing it. At this point the steam in jacket and blades is turned off and the cooling water turned on. A complete mix of 750 pounds of rubber and 450 pounds zinc-oxide is thus obtained serving as master batch to furnish in rubber dispersed zinc-oxide for compounding standard formulæ.

EXAMPLE VI

*Thermo-plastic molding-composition*

Place in machine:

| | Lbs. |
|---|---|
| T. N. shellac | 400 |
| Powdered (150 mesh) Congo copal | 100 |
| Basic lead chromate-water pulp of 30% pigment content | 500 |
| Blanc-fixe pulp of 30% $BaSO_4$ content | 500 |
| Rotten stone | 500 |
| Barytes | 300 |
| Cotton-flock | 30 |

The machine is closed as in Example I and connected with receiver. Through first jacket and mixing blades circulates steam under 20 pound pressure or hot oil at a temperature of 130 degrees C. In the line leading from cover to receiver is a safety valve, set to open at 15 pounds pressure; the valve is put in the line in such a manner that when it opens the released steam discharges into receiver being of course first condensed. When the mass has reached a temperature of 100 degrees C., the mixing blades are set in motion at 40–60 R. P. M. The temperature will rise to about 121 degrees C. when the gauge will indicate 15 pounds pressure which opens the safety valve and keeps it open so that the water of the pulps is continuously removed until in machine remains the plastic compound of the sum total corresponding to the solids of the formula. The mixture must of course be discharged while still in the plastic state in which it is also sheeted so it may finally be used for molding buttons, insulating shapes, etc.

Having thus described my invention, what I claim as new and desire to secure by United States Letters Patent is:

1. A method of processing finely divided solids for ready incorporation into consumer products, which includes the steps of providing an initial dispersion of the finely divided solids in water, providing a suitable quantity of a substantially water-free dispersion medium, heating the said water-free dispersion medium to a temperature sufficient to vaporize water, introducing the said dispersion of finely divided solids in water into said heated dispersion medium at such a rate that the water in the dispersion is separated continuously as vapor on contact with said heated dispersion medium.

2. A method of processing finely divided solids for ready incorporation into consumer products, which includes the steps of providing an initial dispersion of the finely divided solids in water, providing a greater quantity of a substantially water-free dispersion medium, heating the said dispersion medium to a temperature sufficient to vaporize water, introducing the said dispersion of finely divided solids in water into said heated dispersion medium at such a rate that the water in the dispersion is separated continuously as vapor on contact with said heated dispersion medium.

3. A method of processing finely divided solids for ready incorporation into consumer products, which includes the steps of providing an initial dispersion of the finely divided solids in water, providing a suitable quantity of a substantially water-free dispersion medium in a quantity sufficient to act as a dispersion medium for the solids in said dispersion of finely divided solids in water, heating the said substantially water-free dispersion medium to a temperature sufficient to vaporize water, introducing the said dispersion of finely divided solids in water into said heated dispersion medium at such a rate that the water in the dispersion is separated continuously as vapor on contact with said heated dispersion medium.

4. A method of processing finely divided solids for ready incorporation into consumer products, which includes the steps of providing an initial dispersion of the finely divided solids in water, providing a suitable quantity of a substantially water-free dispersion medium, heating the said dispersion medium to a temperature sufficient to vaporize water, agitating the said dispersion medium, and then introducing the dispersion of finely divided solids in water into said dispersion medium, while in motion, at such a rate that the water in the mixture is continuously vaporized on contact with said dispersion medium.

5. The process of treating finely divided solids for ready incorporation into consumer products, which includes the steps of providing a suitable quantity of finely divided solids dispersed in water, providing a suitable quantity of a water-insoluble oil, heating said quantity of oil to a temperature sufficient to vaporize water, then introducing the said dispersion of finely divided solids in water into said heated oil at such a rate that the water in the dispersion is continuously vaporized on contact with said heated oil.

6. The process of treating finely divided solids for ready incorporation into consumer products, which includes the steps of providing a suitable quantity of finely divided solids dispersed in water, providing a suitable quantity of a water-insoluble plastic, heating said quantity of plastic to a temperature sufficient to vaporize water, then introducing the said dispersion of finely divided solids in water into said heated plastic at such a rate that the water in the dispersion is continuously vaporized on contact with said heated plastic.

7. The process of treating finely divided solids for ready incorporation into consumer products, which includes the steps of providing a suitable quantity of finely divided solids dispersed in water, providing a suitable quantity of a water-insoluble softener for soluble cellulose derivatives, heating said quantity of water-insoluble softener to a temperature sufficient to vaporize water, then introducing the said dispersion of finely divided solids in water into said heated softener at such a rate that the water in the dispersion is continuously vaporized on contact with said heated softener.

8. The process of treating finely divided solids for ready incorporation into consumer products, which includes the steps of providing a suitable quantity of finely divided solids dispersed in water, providing a suitable quantity of a water-insoluble resin, heating said quantity of resin to a temperature sufficient to vaporize water, then introducing the said dispersion of finely divided solids in water into said heated resin at such a rate that the water in the dispersion is continuously vaporized on contact with said heated resin.

9. The process for the treatment of pigments to facilitate their ready incorporation into consumer products, which includes the steps of providing a suitable quantity of pigment dispersed in water, providing a suitable quantity of an organic dispersion medium, heating said quantity of organic dispersion medium to a temperature sufficient to vaporize water, introducing the said pigment dispersed in water into said heated organic dispersion medium at such a rate that the water in the mixture is continuously vaporized on contact with said heated organic dispersion medium.

10. The process for treatment of finely divided solids to facilitate ready incorporation thereof into consumer products, which includes the steps of providing a suitable quantity of finely divided water-insoluble solids dispersed in water, providing a suitable quantity of a substantially water-free dispersion medium, evaporating the water from the dispersion of the finely divided solids and water in the presence of the dispersion medium, controlling the evaporation of the water to insure the incorporation of said finely divided solids into the dispersion medium without drying of the solids or change in fineness of the dispersion by a control system, which includes a continuous replacement of the evaporated water by the substantially water-free dispersion medium, agitating the dispersion medium to insure its intimate admixture with said finely divided solids, definite controlling of the temperatures at which the replacement occurs within predetermined limits of temperature between about 75° F. and 212° F., and regulating the relative proportions of the dispersion medium and the finely divided solids under treatment.

11. The process for treatment of finely divided solids to facilitate ready incorporation thereof into consumer products, which includes the steps of providing a suitable quantity of finely divided water-insoluble solids dispersed in water, providing a suitable quantity of a substantially water-free dispersion medium, evaporating the water from the dispersion of the finely divided solids and water in the presence of the dispersion medium, controlling the evaporation of the water to insure the incorporation of said finely divided solids into the dispersion medium without drying of the solids or change in fineness of the dispersion by a control system, which includes a continuous replacement of the evaporated water by the dispersion medium, agitating the dispersion medium to insure its intimate admixture with said finely divided solids, definite controlling of the temperatures at which the replacement occurs within predetermined limits of temperature between about 75° F. and 212° F., maintaining said temperature by the use of a circulating heating medium having a boiling point range within the temperature specified, and regulating the relative proportions of the water free dispersion medium and the finely divided solids under treatment.

12. The process of treating finely divided solids for ready incorporation into consumer products, which includes the steps of providing an initial dispersion of finely divided solids in water, providing a suitable quantity of a substantially water-free dispersion medium, mixing said initial dispersion of finely divided solids in water with said dispersion medium, and removing the water from said mixture by agitating the admixed masses with conditioned air or gas.

13. A process of treating finely divided solids for ready incorporation into consumer products, which includes the steps of providing a suitable quantity of an initial dispersion of finely divided solids in water, providing a suitable quantity of a water-insoluble dispersion medium, mixing the said initial dispersion and said water-insoluble dispersion medium, vaporizing the water in said admixture, controlling the rate of evaporation of the water in such a manner that the finely divided solids are transferred directly from the dispersion in water to the water-insoluble dispersion medium without becoming dry or undergoing substantial change in fineness or uniformity of dispersion.

14. A process for the production of a water-free disperse system which includes the steps of providing an initial dispersoid having finely divided solids in an aqueous dispersion medium, providing a suitable quantity of a substantially water-free dispersion medium, admixing said initial dispersoid with said dispersion medium, under conditions of temperatures and pressures at which water is vaporized and the finely divided solids carried in said initial dispersiod are transferred to and dispersed in said dispersion medium.

15. The process of treating finely divided solids for ready incorporation into consumer products, which includes the steps of providing a suitable quantity of an initial dispersion of finely divided solids in water, providing a suitable quantity of an oily dispersion medium insoluble in water, mixing the said initial dispersion and said oily dispersion medium to form an emulsion of the oil-in-water type, then converting said emulsion to the water-in-oil type by the removal of water in the vapor phase from said emulsion.

16. The process of treating finely divided solids for ready incorporation into consumer products, which includes the steps of providing a suitable quantity of an initial dispersion of finely divided solids in water, providing a suitable quantity of oily dispersion medum insoluble in water, mixing the said initial dispersion and said oily dispersion medium to form an emulsion of the oil-in-water type, adding to the said emulsion a suitable quantity of anhydrous wool grease and converting said emulsion to an emulsion of the water-in-oil type, by heating the emulsion and removing the water in the vapor phase therefrom.

17. A method of pigmenting printing ink which includes the steps of providing a suitable quantity of an initial dispersion of pigment in water, providing a suitable quantity of a linseed oil printing ink varnish which is insoluble in water, mixing the dispersion of pigment in water and said varnish to form an initial emulsion in which water is the continuous phase, then converting said initial emulsion to an emulsion in which the dispersion of pigment and water is the inner phase by the removal from said initial emulsion of the water as vapor.

18. A method of forming Prussian-blue printing ink which includes the steps of admixing Prussian-blue water pulp and linseed oil printing ink varnish in suitable quantities to form an initial emulsion in which water is the continuous phase, then converting said emulsion to an emulsion in which the water is the inner phase by adding a suitable quantity of anhydrous wool grease to the emulsion and heating the admixture to vaporize and drive off water from the said initial emulsion.

EMILE C. DE STUBNER.